April 1, 1969 Z. MACK 3,436,685

BRIDGE TYPE CROSS DEMODULATOR HAVING CAPACITIVE REACTANCE BRANCHES

Filed May 4, 1966 Sheet 1 of 2

INVENTOR.
Zdeněk Mack
BY
Richard Lowd
Ag't

April 1, 1969 Z. MACK 3,436,685

BRIDGE TYPE CROSS DEMODULATOR HAVING CAPACITIVE REACTANCE BRANCHES

Filed May 4, 1966 Sheet 2 of 2

INVENTOR.
Zdeněk Mack
BY
Richard Low
Agt

United States Patent Office 3,436,685

Patented Apr. 1, 1969

3,436,685

BRIDGE TYPE CROSS DEMODULATOR HAVING CAPACITIVE REACTANCE BRANCHES

Zdeněk Mack, Prague, Czechoslovakia, assignor to Tesla, narodni podnik, Prague, Czechoslovakia Filed May 4, 1966, Ser. No. 547,578

Claims priority, application Czechoslovakia, May 6, 1965, 2,954/65

Int. Cl. H03c *1/54;* H03d *3/18, 1/10*

U.S. Cl. 332—47 6 Claims

ABSTRACT OF THE DISCLOSURE

Each of the branches of a demodulator bridge circuit comprises a capacitive reactance having two components connected in series between a corresponding pair of junctions. At least one of the components is a capacitor. One of the electrodes of each of a plurality of diodes is connected to a common point and the other electrode of each diode is connected to a corresponding one of the branches at a common point in the connection between the two components of the branch. The diodes are connected with each pair connected in series between common points of opposite branches of the bridge circuit connected in opposed polarity relationship. The polarities of the diodes of one pair connected to the common points are opposite the polarities of the diodes of the other pair connected to the common points.

The present invention relates to the improvement in a reactance cross modulator or demodulator with the reactance elements in the branches of the bridge.

Figure 1:
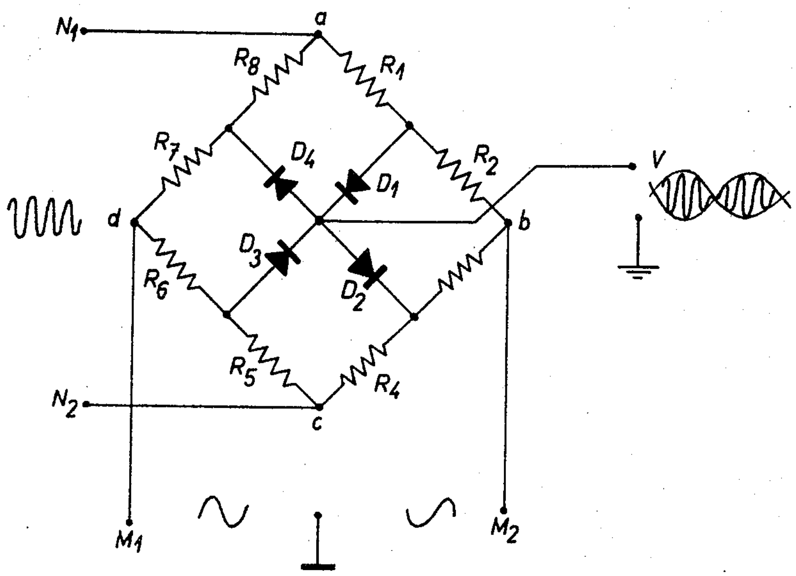
Fig. 1 PRIOR ART

FIG. 1 shows the known circuit arrangement comprising a bridge the branches of which consist of the effective resistances $R_1$ to $R_8$. The carrier wave is applied to one pair of the opposite junctures *a*, *c*, whereas a symmetrically modulated wave or the both modulating signals are applied to the other pair of the opposite junctures *b*, *d*. The modulator output is at the point V in which the diodes are interconnected, their remaining electrodes being supplied from the branches of the bridge.

If the described modulator operates as a synchronous demodulator, the carrier wave is applied to one pair of the opposite junctures *a*, *c* symmetrically. The modulated signal is applied either to the common point V of all the four diodes, the output signal or signals being drawn from the two remaining junctures *d*, *b*, or the modulated signal is applied to the remaining two junctures, the output signal being taken from the common point V of all the four diodes.

A drawback of the described circuit arrangement is that the branches of the bridge consist only of the effective resistors in which the effective output power is needlessly consumed. Another drawback of the said circuit occurs in its use as a synchronous demodulator operating in principle as a detector of the root mean square value, i.e. that it delivers a low frequency voltage to its output with a half amplitude that corresponds to the amplitude of the modulating envelope.

These drawbacks of the cross modulator with the effective resistors may be removed by the use of reactance elements in the branches of the modulator bridge according to the invention.

The object of the invention is the reactance cross modulator and demodulator characterised in that the branches of the bridge consist of combinations of capacitances, inductances and resistances.

The reactance elements in the bridge branches in accordance with the invention may be either capacitive, inductive or may comprise combinations of capacitors, resistors and inductors, respectively. Thereby the mentioned drawbacks may not only be removed but a lot of valuable properties may be gained and provisions attained to accommodate to the surrounding conditions as shown in the succeeding several special cases.

In FIG. 1, a modulated carrier wave is supplied at the terminal V when a carrier wave is supplied to the terminals $N_1$ and $N_2$ and modulating signals are supplied to the terminals $M_1$ and $M_2$.

Figure 2:
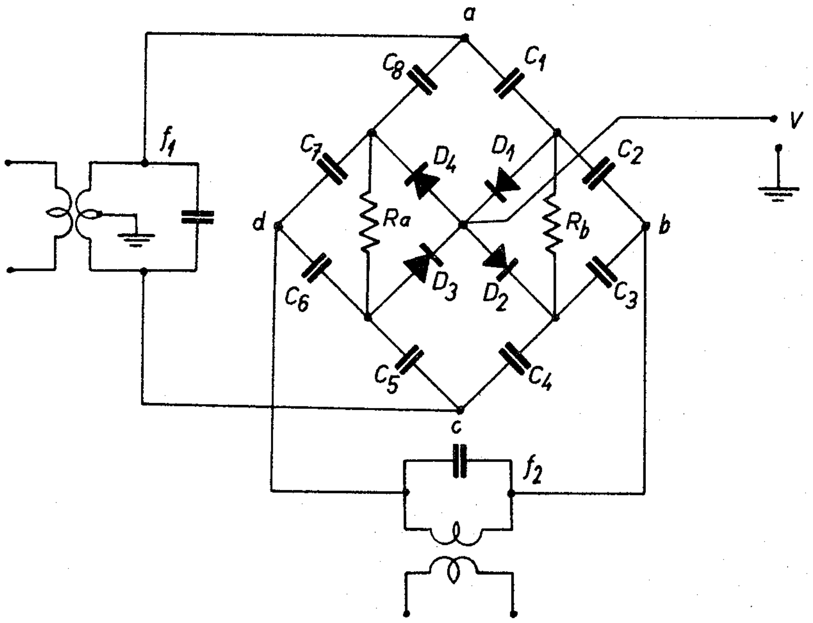

FIG. 2 shows an example of a circuit arrangement of a cross modulator operating as a mixer. The branches of the bridge consist of the capacitors $C_1$ to $C_8$ only. This circuit arrangement is particularly convenient for frequencies in the range of 1 to 50 mcs., where the influence of the stray capacities cannot be eliminated. The bridge capacitors form a part of the capacitances of the resonance circuits and consequently no needless loss of power takes place in the effective resistors. The resistors $R_a$ and $R_b$ close only the DC circuit of the diodes and may be replaced by inductors. There are no undesired phase shifts in this circuit due to the stray capacities, which are included in the bridge capacitors $C_1$ to $C_8$. Variation of the capacitors or the use of variable capacitors permits the balancing of the bridge without additional circuitry. Capacitors are preferable to potentiometers since potentiometers do not include reactive components.

Figure 3:
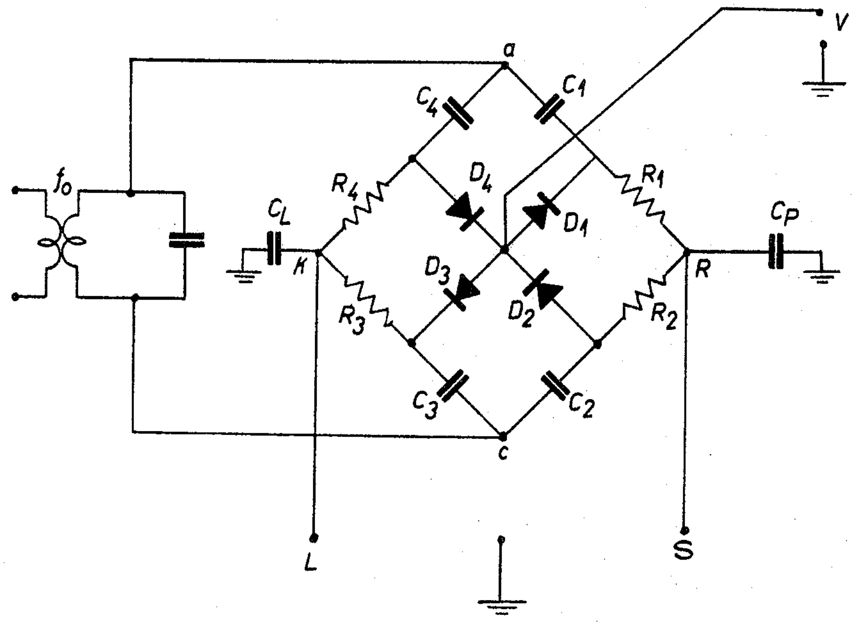

FIG. 3 shows an example of a cross modulator operating as a synchronous demodulator, the branches of the bridge comprising reactance elements. The carrier wave is applied to the bridge junctures *a*, *c* and the modulated signal to the midpoint V of the bridge. The demodulator operates as follows: during the one half-periods of the carrier wave in which e.g. the diodes $D_1$, $D_2$ are conductive, the capacitors $C_1$ and $C_2$ are loaded through the conductive diodes. During the succeeding half-periods the diodes become non-conductive and the capacitors are discharged through the resistors $R_1$ and $R_2$. The capacitors $C_1$, $C_2$ are loaded during a shorter time than a half-period and in consequence also the diodes $D_1$, $D_2$ are opened for a shorter time than the half-period. Discharging then lasts longer than one half-period. If no voltage is applied to the midpoint of the demodulator there is no voltage at the point R relative to ground. However, if a voltage appears at the midpoint V, then the capacities are non-uniformly loaded and there appears at the point R a voltage of a little lower value than the input voltage. As it is seen the demodulation is performed on the principle of the peak detector function so that the low frequency demodulated voltage is approximatively as high as the modulating envelope. In comparison with the cross demodulator with the effective resistors it is an essential advantage.

In each of FIGS. 2 and 3 a modulated carrier wave is supplied to the input terminal V, a carrier wave is derived from the junctures *a*, *c* and a demodulated signal is derived from the junctures *d*, *b* and K, R, respectively.

The capacitors $C_P$ and $C_L$ may be filter capacitors which may eventually form with the output resistive demodulator the de-emphasis circuit, e.g. in the broadcast stereophony. The low frequency filter comprises the resistors $R_1$, $R_2$ and the capacitor $C_P$ and is connected to the juncture R. The filter prevents the penetration of the carrier wave into the modulating channel. This is also true of the resistors $R_3$, $R_4$ and the capacitor $C_L$.

What I claim is:

1. A reactance cross demodulator, comprising a plurality of non-linear impedance diodes connected with one of the electrodes of each connected to a common point;

a plurality of capacitors;

a bridge circuit having a plurality of branches and a plurality of junctures, each of said junctures being at the point of intersection of adjacent branches, each of said branches comprising a capacitive reactance having two components connected in series between a corresponding pair of junctures, at least one of said components being one of said capacitors, the other electrode of each of said diodes being connected to a corresponding one of said branches at a common point in the connection between the two components of said branch, said diodes being connected in a manner whereby each pair thereof connected in series between common points of opposite branches of said bridge circuit is connected in opposed polarity relationship, the polarities of the diodes of one pair connected to said common points being opposite the polarities of the diodes of the other pair connected to said common points;

means for supplying a modulated carrier wave to the common point of said diodes;

means for providing a carrier wave at a pair of said junctures; and means for providing a demodulated wave at another pair of said junctures.

2. A reactance cross demodulator as claimed in claim 1, wherein each of the two components of each branch comprises a capacitor.

3. A reactance cross demodulator as claimed in claim 1, wherein there is a plurality of resistors, and one of the two components of each branch comprises a capacitor and the other comprises a resistor.

4. A reactance cross demodulator as claimed in claim 1, wherein a pair of said diodes is connected in series with the anode of each connected to that of the other and the cathode of each connected to a common point in a corresponding one of a pair of opposite branches and another pair of said diodes is connected in series with the cathode of each connected to that of the other and the anode of each connected to a common point in a corresponding one of another pair of opposite branches, the anodes of said pair of diodes being connected to a common point with the cathodes of said other pair of diodes.

5. A reactance cross demodulator as claimed in claim 4, wherein each of the two components of each branch comprises a capacitor.

6. A reactance cross demodulator as claimed in claim 4, wherein one of the two components of each branch comprises a capacitor and the other comprises a resistor.

References Cited

UNITED STATES PATENTS

| | | | |
|---|---|---|---|
| 2,373,569 | 4/1945 | Kannenberg | 332—47 X |
| 3,010,079 | 11/1961 | Straube | 332—47 |
| 3,121,843 | 2/1964 | Ule | 328—208 X |
| 3,124,767 | 3/1964 | Pospischil | 332—47 |
| 3,201,678 | 8/1965 | Meixell | 332—47 X |

ALFRED L. BRADY, *Primary Examiner.*

U.S. Cl. X.R.

329—50, 204, 166; 328—133, 208; 307—257, 321